United States Patent
Heinle et al.

(10) Patent No.: US 7,684,832 B2
(45) Date of Patent: Mar. 23, 2010

(54) METHOD OF CONNECTING AN UMTS MOBILE RADIO TO A NETWORK

(75) Inventors: Frank Heinle, Nürnberg (DE); Axel Hertwig, Nürnberg (DE); Cornelis Hermanus Van Berkel, Heeze (NL); Patrick Peter Elizabeth Meuwissen, Eindhoven (NL)

(73) Assignee: ST-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 10/515,081

(22) PCT Filed: May 19, 2003

(86) PCT No.: PCT/IB03/01910

§ 371 (c)(1), (2), (4) Date: Nov. 18, 2004

(87) PCT Pub. No.: WO03/100998

PCT Pub. Date: Dec. 4, 2003

(65) Prior Publication Data

US 2005/0164723 A1 Jul. 28, 2005

(30) Foreign Application Priority Data

May 23, 2002 (DE) ............... 102 22 970

(51) Int. Cl.
*H04B 1/38* (2006.01)

(52) U.S. Cl. ............ 455/574; 455/434; 455/67.11; 455/515; 455/509; 455/502; 370/311; 370/331; 370/350

(58) Field of Classification Search ......... 455/436–437, 455/438, 450, 452.2, 439, 445, 572–574, 455/502–509, 522, 343.1–343.6, 434, 515, 455/67.11; 370/311, 350
See application file for complete search history.

(56) References Cited

U.S. PATENT DOCUMENTS

| | | | | |
|---|---|---|---|---|
| 5,224,152 A | * | 6/1993 | Harte | 455/574 |
| 5,369,798 A | * | 11/1994 | Lee | 455/434 |
| 5,392,287 A | * | 2/1995 | Tiedemann et al. | 370/311 |
| 5,471,655 A | * | 11/1995 | Kivari | 455/127.5 |
| 5,574,996 A | * | 11/1996 | Raith | 455/161.3 |

(Continued)

FOREIGN PATENT DOCUMENTS

WO    WO 00 67399 A    11/2000

OTHER PUBLICATIONS

"3rd Generation Partnership Project: Technical Specification Group Radio Access Network; Physical layer procedures (FDD)", Technical Specification, 3GPP TS 25.214 V3.12.0, 2003, 52 pages.

(Continued)

*Primary Examiner*—Sharad Rampuria
(74) *Attorney, Agent, or Firm*—Robert Iannucci; Seed IP Law Group

(57) ABSTRACT

To achieve a shortening of the initial synchronization time and/or extension of the stand-by time with a method of connecting an UMTS mobile radio to a network, the UMTS mobile radio receives and stored in one or more time-limited RF receive windows the signals that are subsequently evaluated when the HF receiver is switched off.

20 Claims, 3 Drawing Sheets

U.S. PATENT DOCUMENTS

| | | | |
|---|---|---|---|
| 5,640,677 A * | 6/1997 | Karlsson | 455/434 |
| 5,745,860 A * | 4/1998 | Kallin | 455/574 |
| 5,764,651 A * | 6/1998 | Bullock et al. | 714/708 |
| 5,794,137 A * | 8/1998 | Harte | 455/343.4 |
| 5,797,094 A * | 8/1998 | Houde et al. | 455/412.2 |
| 5,799,256 A * | 8/1998 | Pombo et al. | 455/574 |
| 5,878,336 A * | 3/1999 | Cashen et al. | 455/343.4 |
| 5,940,771 A * | 8/1999 | Gollnick et al. | 455/517 |
| 5,953,677 A * | 9/1999 | Sato | 455/574 |
| 6,047,200 A * | 4/2000 | Gibbons et al. | 455/574 |
| 6,067,460 A * | 5/2000 | Alanara et al. | 455/574 |
| 6,069,929 A * | 5/2000 | Yabe et al. | 375/368 |
| 6,138,034 A * | 10/2000 | Willey | 455/522 |
| 6,151,353 A | 11/2000 | Harrison | |
| 6,201,966 B1 * | 3/2001 | Rinne et al. | 455/434 |
| 6,212,398 B1 * | 4/2001 | Roberts et al. | 455/502 |
| 6,240,304 B1 * | 5/2001 | Blankenstein et al. | 455/574 |
| 6,311,064 B1 * | 10/2001 | Bamburak et al. | 455/434 |
| 6,385,460 B1 * | 5/2002 | Wan | 455/515 |
| 6,385,469 B1 * | 5/2002 | Alperovich et al. | 455/574 |
| 6,449,494 B1 * | 9/2002 | Cashman | 455/553.1 |
| 6,505,058 B1 * | 1/2003 | Willey | 455/574 |
| 6,535,752 B1 * | 3/2003 | Dent | 455/574 |
| 6,615,033 B1 * | 9/2003 | Cragun | 455/502 |
| 6,741,836 B2 * | 5/2004 | Lee et al. | 455/41.2 |
| 6,804,542 B1 * | 10/2004 | Haartsen | 455/574 |
| 6,862,431 B2 * | 3/2005 | Richter | 455/67.11 |
| 6,889,067 B2 * | 5/2005 | Willey | 455/574 |
| 6,904,282 B2 * | 6/2005 | Cooper | 455/434 |
| 6,968,219 B2 * | 11/2005 | Pattabiraman et al. | 455/574 |
| 6,973,310 B2 * | 12/2005 | Neufeld | 455/436 |
| 7,020,102 B2 * | 3/2006 | Tuomainen et al. | 370/311 |
| 7,035,676 B2 * | 4/2006 | Ranta | 455/574 |
| 7,158,778 B2 * | 1/2007 | Sameer et al. | 455/412.2 |
| 7,197,341 B2 * | 3/2007 | Bultan et al. | 455/574 |
| 7,295,827 B2 * | 11/2007 | Liu et al. | 455/343.2 |
| 7,305,259 B1 * | 12/2007 | Malone et al. | 455/574 |
| 7,330,740 B2 * | 2/2008 | Bennett et al. | 455/574 |
| 7,512,423 B2 * | 3/2009 | Karaoguz | 455/574 |
| 7,542,437 B1 * | 6/2009 | Redi et al. | 370/311 |
| 2001/0028674 A1 * | 10/2001 | Edlis et al. | 375/130 |
| 2003/0058820 A1 * | 3/2003 | Spencer et al. | 370/332 |
| 2003/0153271 A1 * | 8/2003 | Brandt et al. | 455/67.1 |
| 2003/0207688 A1 * | 11/2003 | Nikkelen | 455/439 |
| 2005/0221869 A1 * | 10/2005 | Liu et al. | 455/574 |

OTHER PUBLICATIONS

Wang, Yi-Pin Eric et al., "Cell Search in W-CDMA," IEEE Journal on Selected Areas in Communications, vol. 18, No. 8, Aug. 2000, pp. 1470-1482.

* cited by examiner

METHOD OF CONNECTING AN UMTS MOBILE RADIO TO A NETWORK

The invention relates to a method of connecting an UMTS mobile radio to a network, more particularly of shortening the initial synchronization time and/or extending the standby time of an UMTS mobile radio, the UMTS mobile radio, when its HF receiver is switched on, receiving signals from the base stations around it on various physical channels of the UMTS (Universal Mobile Telecommunication System), which signals are particularly used for initial synchronization, neighbor cell measurement and paging reception and occur in certain frames of the UMTS.

Such a method is known from technical specification 3 GPPTS 25.214 V3.10.0 (2002 to 2003), more particularly Annex C, p. 49, and from the title WCDMA for UMTS, Radio Access For Third Generation Mobile Communications, Harri Holma, Antti Toskala, John Wiley & Sons, Ltd., Chichester, N.Y., Weinheim, Brisbane, Singapore, Toronto.

Contrary to the GSM system, UMTS has CDMA (code-division multiple access). The information is then always simultaneously available in the various physical channels. The various physical channels are particularly used for the initial synchronization, for the neighbor cell measurement and the paging reception. The channels are in particular:

PSCH primary synchronization channel
SSCH secondary synchronization channel
CPICH common pilot channel
PICH paging indication channel
PCH paging channel, where further channels are added for further functions which, however, may be ignored in this context.

With mobile radios the standby time, that is the period of time up to the necessary recharging of the battery, is an important property of use. Mobile radios usually switch to an energy-saving mode when there is no active speech or data connection. However, the mobile radio is to periodically receive information from the network to be informed of an incoming call and to establish changes of base stations in the environment. For this purpose the high-frequency (HF) receiver of the mobile radio is to be switched on. The standby time is determined by the power consumption of the HF receiver. The power consumption of the HF receiver is high compared to the other systems of the mobile radio. The shorter the HF receiving windows are the longer will be its availability.

The time necessary for an initial synchronization of the mobile radio is to be short so that the mobile radio, once it has changed its location, finds a network connection in minimal time and goes to the standby mode.

In UMTS mobile radios the greater part of the signal processing functions is usually implemented in real-time hardware. Due to the high data rate at the input of the digital baseband receiver of the UMTS mobile radio, the incoming data are processed as they come in (on the fly). Only the final results of the respective bills are stored. All processing steps which need information from previous steps are executed sequentially. During this time the HF receiver is to be switched on. Since the sequential processing requires a long time, the RF receive window is to be equally long. Due to the high power consumption when the HF receiver is switched on, the standby time is reduced accordingly. This holds both for the initial synchronization and for the neighbor cell measurement and paging reception to be executed during the standby time.

It is an object of the invention in a method of the type defined in the opening paragraph to shorten the initial synchronization time and/or lengthen the standby time.

The above object is achieved by the features of the characterizing part of claim 1.

In a time-limited receive window the signals of all interesting channels are received simultaneously and stored. At the beginning of the receive window the HF receiver is switched on. At the end of the receive window the HF receiver is switched off. The evaluation of the stored signals then takes place when the HF receiver is switched off, thus in a time in which the power consumption of the mobile radio is comparatively low. All in all this leads to a lengthening of the standby time. The digital signal processing thus takes place off-line.

In addition to the shortening of the initial synchronization time and the lengthening of the standby time there are the following further advantages:

a) since the same receiving data are used for the various processing steps, it is very simple to keep intermediate results consistent, which is problematic with a real-time hardware solution because the channel conditions may change significantly between the processing steps;

b) because of the off-line processing and data buffering, the digital signal processing can clearly be scaled more flexibly and planned and executed in time than in conventional UMTS mobile radios. This allows to carry out the processing efficiently in dependence on the respective conditions.

The RF receive window preferably has the time length of a frame of the UMTS. This frame is 10 ms long. The RF receive window, however, may also have a variable length of time in dependence on the receiving conditions.

These and other aspects of the invention are apparent from and will be elucidated with reference to the embodiments described hereinafter.

Figure 1:
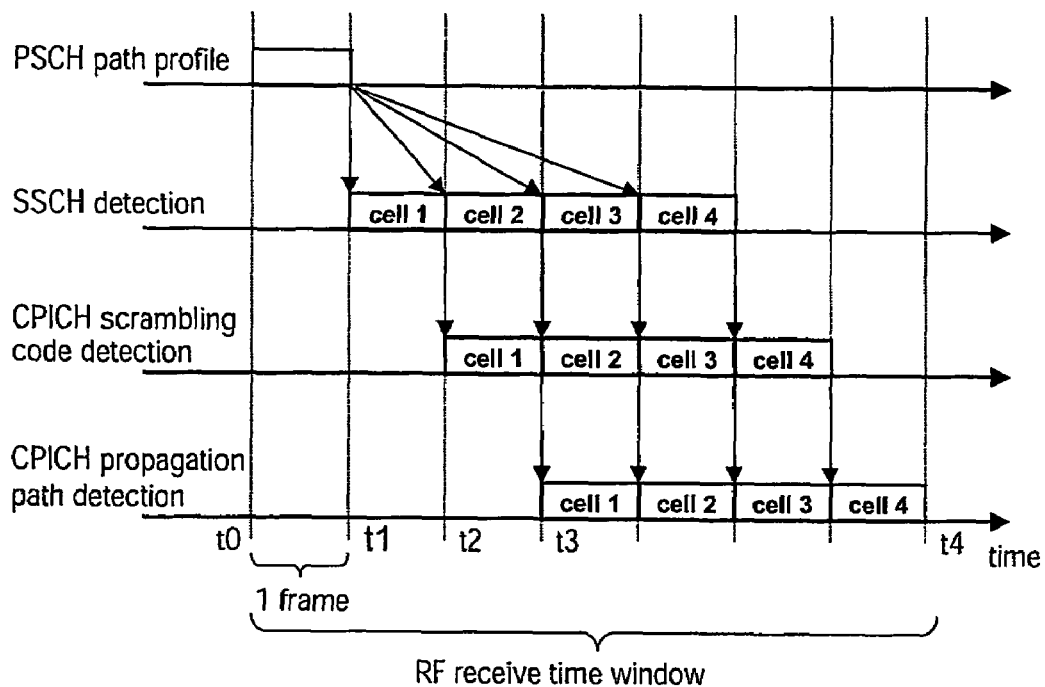
FIG. 1 shows the idealized time ratios with a usual UMTS initial synchronization.

In FIGS. 1 to 4 only three relevant neighbor cells are assumed to simplify the drawing. In practice, up to 32 neighbor cells are to be captured.

The basic method for the initial synchronization in conventional UMTS mobile radios is the following (compare FIG. 1):

1. The user switches the mobile radio on at a random instant t0. In a first step the primary synchronization channel (PSCH) is evaluated to find all propagation paths of all the base stations or cells respectively in the environment. This first step is made in any one of the predefined UMTS frames that lasts 10 ms. With the data information transmitted over the PSCH it is not possible yet to distinguish the various base stations and establish the start of the UMTS frame.

2. Therefore, propagation paths that seem to be effective as regards their power are selected from the number of propagation paths found in the first step. Based on this selection the scrambling code group and the position in time of the frame i.e. the frame timing of the base station that belongs to the selected paths is identified in the secondary synchronization channel (SSCH). The evaluation of the SSCH starts around instant t1 after the first frame and lasts again 1 frame up to instant t2.

3. In a third step the selected paths are identified as regards their timing and as regards the scrambling code group of the respective base station (cell 1) via the common control channel, the so-called common pilot channel (CPICH).

4. In a fourth step, beginning at instant t3, all the paths occurring in a certain time interval are detected with the aid of the CPICH. The paths found are struck off a path list and earmarked. Then said steps are executed for further paths of the neighboring base stations (cell 2, cell 3, cell 4) which lasts until instant t5. At instant t4 the initial synchronization has then been carried out. During the period of time T between instant t0 and t4 the HF receiver of the mobile radio is to be switched on. This time ideally lasts at least 7 frames i.e. 70 ms. In practice this may even be several minutes if the mobile radio in switched-off mode is brought within range of remote base stations.

In contrast to this, the initial synchronization according to the suggested solution is carried out in the following way (compare FIG. 2).

The user switches the UMTS mobile radio on at a random instant. After a certain build-up time at instant t0 a memory of the mobile radio receives all the information occurring in a single frame of the PSCH, SSCH, CPICH of the accepted four cells (compare frame buffering in FIG. 2). This takes place in the period of time t0 to t1, within a single frame i.e. 10 ms. At the instant t1 the HF receiver switches off. The period of time Ta between t0 and t1 is the receive window. The stored information is evaluated after the instant t1 in the mobile radio while the HF receiver is switched off.

Figure 2:
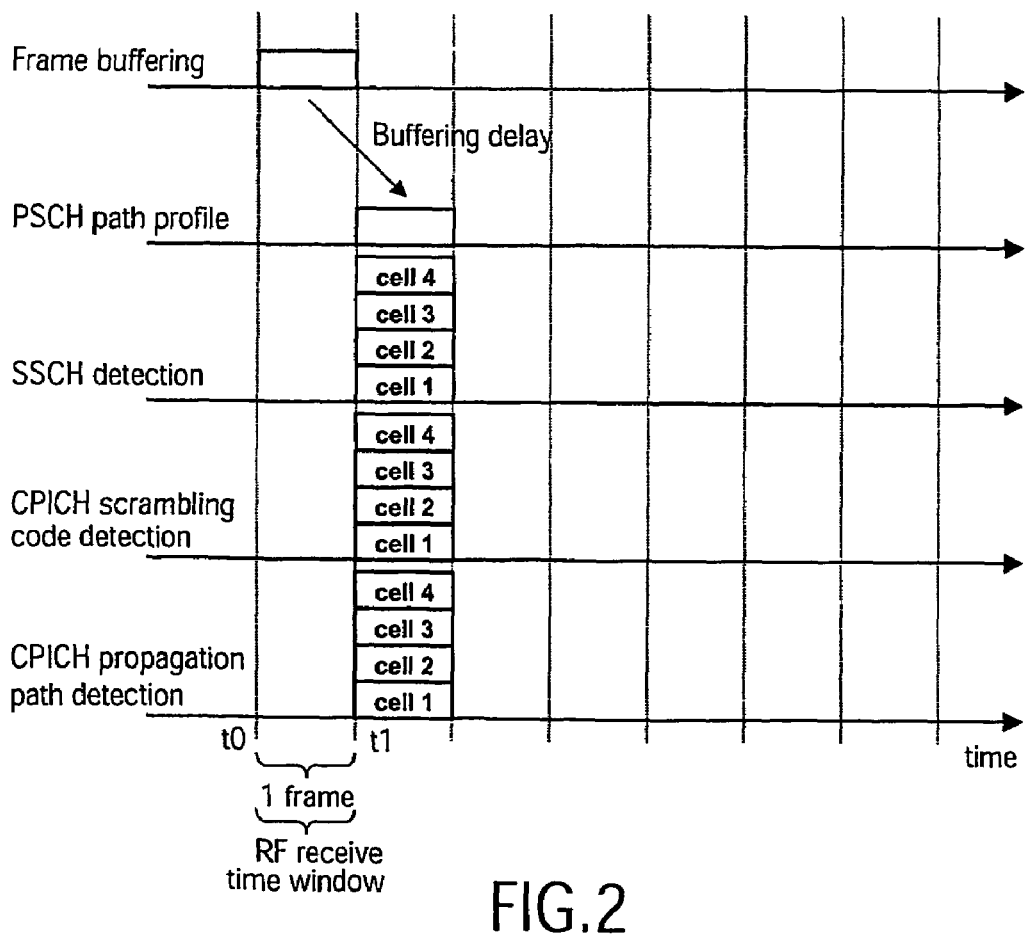
FIG. 2 shows the time ratios with an initial synchronization according to the invention.

Comparison of the FIGS. 1 and 2 shows that with the method shown in FIG. 2 the necessary receive window is shorter by a factor of 7 than with the method shown in FIG. 1.

In the standby mode most components of an UMTS mobile radio are normally switched off to save current. They are activated periodically for receiving pagings i.e. call announcements and system measurements with respect to neighbor cells. The basic method in the commercial UMTS receivers is in essence the following (compare FIG. 3):

1. The mobile radio periodically resynchronizes in the standby mode with the current base station or cell of the network determined during the previous initial synchronization. In the following example this is cell 1. Generally, not always a complete initial synchronization is carried out because this complete initial synchronization is not necessary, but only a path search is made on the CPICH (compare FIG. 3, CPICH propagation path detection on serving cell). This operation lasts 1 frame i.e. 10 ms.

2. Subsequently, the paging reception is executed (compare FIG. 3 paging reception), which takes place on a higher-order paging channel, on the paging indication channel (PICH) and on the special paging channel, the so-called paging channel (PCH). The PICH relates to a group of mobile radios and the PCH then pages a single mobile radio from this group. The PCH completely contains the concrete identification number of the mobile radio to be paged.

A measurement of the neighbor cells cell 2, cell 3, cell 4 starts simultaneously with the evaluation of the paging signals on the channels PICH, PCH. The paging period lasts at least 8 frames (not shown in FIG. 3). In the method shown in FIG. 3 the HF receiver is to be switched on for at least four frames in a paging period that contains eight frames.

In the method according to the invention, on the other hand, the procedure is as follows (compare FIG. 4):

1. The HF receiver is switched on at a defined instant t0' shortly before the necessary information of the PCH is transmitted by the base station.

2. After a build-on time of the receiver the complete information of a frame of the UMTS signal is received and stored in the mobile radio. This is effected between the instants t0' and t1' (compare FIG. 4 frame buffering).

3. The HF receiver is again switched off after the end of one frame, at t1'. The frame situated between t0' and t1' is stored. The information contained therein and dealing with the respective channels can then further be processed while the HF receiver is switched off (compare FIG. 4 processing time window).

4. The information contained in the PICH may be ignored because the necessary information is also available on the PCH.

The received data are used for resynchronization with the serving cell of the network. By means of the data received between t0' and t1' also the necessary UMTS system measurements of the neighbor cells are evaluated.

Figure 3:
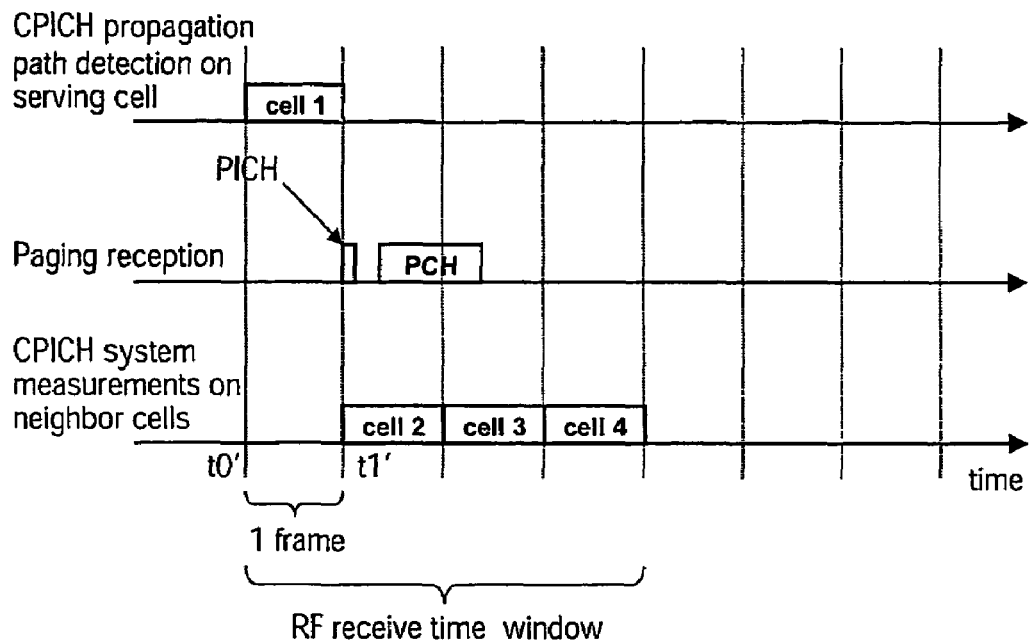
FIG. 3 shows the usual time ratios periodically recurring during the standby time for a paging signal and a neighbor cell measurement for UMTS.
Figure 4:
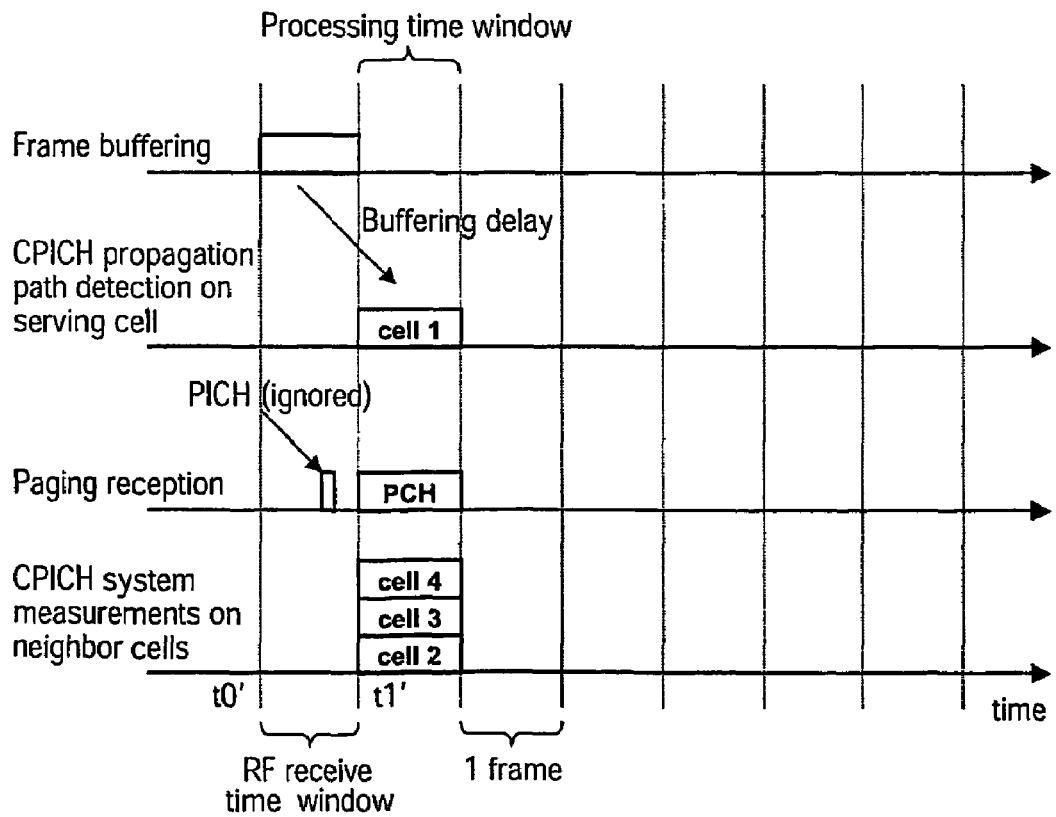
FIG. 4 shows the ratios occurring during the standby time with a method according to the invention.

The comparison of the examples of embodiment described (compare FIGS. 3, 4) shows that with the method according to the invention shown in FIG. 4 the RF receive window is shorter by a factor of 4 than with the method shown in FIG. 3, which means a considerable lengthening of the standby time. The proposed solution allows the shortening of the RF receive window by the number of the neighbor cells. If, in addition, the gap between the PICH signal and the PCH signal is ignored, a further reduction of the switch-on time of the HF receiver can be achieved if the UMTS measuring period for the neighbor cell measurements is longer than the paging period (compare FIG. 5).

Figure 5:
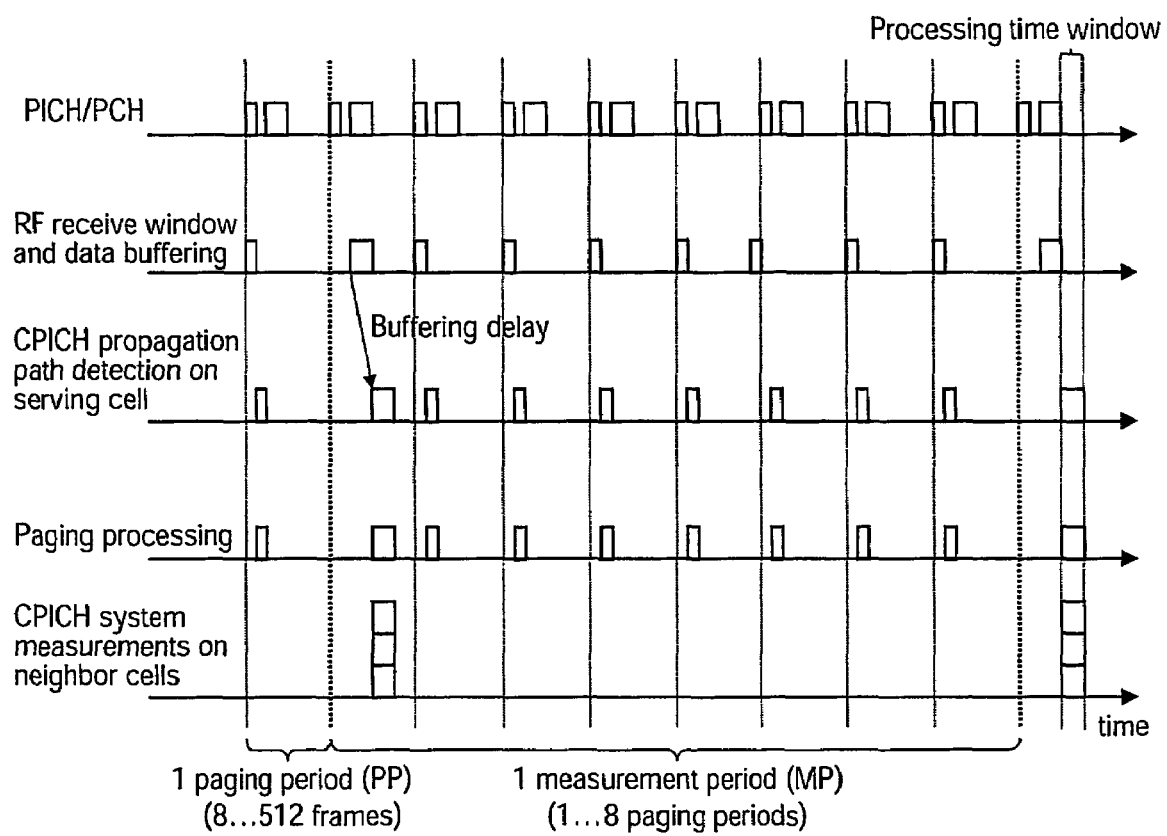
FIG. 5 shows a further possibility where it is assumed that the respective mobile radio is not called by the paging signal and that the measuring period of the neighbor cell measurement is longer than the paging period.

In FIG. 5 are shown a paging period PP which comprises 8 to 512 frames and a measuring period MP used for the neighbor cell measurement, which lasts 8 paging periods. PICH and PCH signals occur in each paging period. HF receive time windows (RF receive windows) are found in each PICH signal and only in one PCH signal of the measuring period MP. Further to the respective RF receive window, as also found in FIG. 4, the post-synchronization with the serving cell (compare FIG. 5 CPICH propagation path detection on serving cell), the paging evaluation (compare FIG. 5 paging processing) and the neighbor cell measurement (compare FIG. 5, CPICH system measurements on neighbor cells). The RF receive windows are 533 µs long at the most in PICH. The RF receive window has the length of a frame in PCH. After storage, the signals are processed off-line, as is described. The total RF receive time is 10 ms+7×533 µs i.e. 13.73 ms. Compared with the 8 frames (80 ms) which are needed for a full PCH reception, this is a further saving by the factor of 80/13.73=5.82.

The RF receive windows need not have the time length of one frame. They may also be shorter or longer or variable. For example, the RF receive window may be selected to be as long as the longest individual processing step lasts to completely store this information for the next evaluation.

The invention claimed is:
1. A method, comprising:
connecting a mobile radio of a UMTS (Universal Mobile Telecommunication System) to a network, the mobile radio comprising an HF high-frequency) receiver, the connecting including:
receiving signals from base stations on plural physical channels of the UMTS, which signals are particularly used for initial synchronization, neighbor cell measurement and paging reception and occur in certain frames of the UMTS, wherein signals lying in one or more RF (radio-frequency) receive windows are received by the mobile radio;
storing in the mobile radio the received signals of the one or more RF receive windows;
switching off the HF receiver after storing the received signals; and
evaluating the stored signals in the mobile radio while the HF receiver is switched off, during which time no HF signals are received by the mobile radio; and
based on said evaluation, turning on the HF receiver and establishing a connection to the network.

2. A method as claimed in claim 1, wherein the one or more RF receive windows each have a time length, and further comprising:
determining which processing step lasts longest; and
setting the time length of each of the one or more RF receive windows to be equal to that of the determined processing step.

3. A method as claimed in claim 1, wherein the one or more RF receive windows each have at most a time length of one frame of the UMTS.

4. A method as claimed in claim 1, wherein the one or more RF receive windows each have a variable time length in dependence on receive conditions.

5. A method as claimed in claim 1, wherein for an initial synchronization the HF receiver is switched on at a random instant and after a build-up time a frame of a UMTS signal from one of the base stations is received and stored.

6. A method as claimed in claim 1,
wherein in a standby mode of the mobile radio the HF receiver is periodically switched on at defined instants to receive paging signals (PICH, PCH) and carry out a neighbor cell synchronization while the defined instants are shortly before the reception of the PCH (paging channel) information.

7. A method as claimed in claim 1, wherein a PICH (paging indication channel) is ignored whereby the PICH information is not received and stored, if a PCH (paging channel) is received and stored.

8. A method as claimed in claim 1,
wherein in response to when a measuring period in which a neighbor cell measurement takes place longer than a paging period, a PCH is received and stored and evaluated only once per measuring period and otherwise in each paging period only a PICH (paging indication channel) is stored and evaluated.

9. A mobile radio, comprising:
an HF (high-frequency) receiver configured to receive signals from base stations, the signals situated in one or more RF (radio-frequency) receive windows;
a storage unit configured to store the received signals; and
logic configured to:
switch off the HF receiver after the signals are stored;
evaluate the stored signals while the HF receiver is switched off, during which time no HF signals are received by the mobile radio; and
based on said evaluation, turning on the HF receiver and establishing a connection to the network.

10. The mobile radio of claim 9, wherein no HF signals are received by the mobile radio during a time period that lasts at least about several frames.

11. The mobile radio of claim 9, wherein the one or more RF receive windows each have a time length, and wherein the logic is further configured to:
determine which processing step lasts longest; and
set the time length of each of the one or more RF receive windows to be equal to that of the determined processing step.

12. The mobile radio of claim 9, wherein the mobile radio is part of a UMTS (Universal Mobile Telecommunication System) and the one or more RF receive windows each have at most a time length of one frame of the UMTS.

13. The mobile radio of claim 9, wherein the one or more RF receive windows each have a variable time length in dependence on receive conditions.

14. The mobile radio of claim 9, wherein for an initial synchronization the HF receiver is switched on at a random instant and after a build-up time a frame of the a UMTS (Universal Mobile Telecommunication System) signal from one of the base stations is received and stored.

15. The method of claim 1, wherein no HF signals are received by the mobile radio during a time period that lasts at least about several frames.

16. A method, comprising:
connecting a mobile radio of a UMTS (Universal Mobile Telecommunication System) to a network, the mobile radio comprising an HF (high-frequency) receiver, the connecting including:
receiving signals from base stations on plural physical channels of the UMTS, the signals lying in an RF (radio-frequency) receive window;
storing in the mobile radio the received signals;
switching off the HF receiver after storing the received signals; and
evaluating the stored signals in the mobile radio while the HF receiver is switched off, during which time no HF signals are received by the mobile radio; and
based on said evaluation, turning on the HF receiver and establishing a connection to the network.

17. The method of claim 16, wherein the RF receive window has at most a time length of one frame of the UMTS.

18. The method of claim 16, wherein the RF receive window has a time length that depends on receive conditions.

19. The method of claim 16, wherein in a standby mode of the mobile radio the HF receiver is periodically switched on at defined instants to receive paging signals (PICH, PCH) and carry out a neighbor cell synchronization while the defined instants are shortly before the reception of the PCH (paging channel) information.

20. The method of claim 16, wherein a PICH (paging indication channel) is ignored whereby the PICH information is not received and stored, if a PCH (paging channel) is received and stored.

* * * * *

UNITED STATES PATENT AND TRADEMARK OFFICE
CERTIFICATE OF CORRECTION

| | | |
|---|---|---|
| PATENT NO. | : 7,684,832 B2 | Page 1 of 1 |
| APPLICATION NO. | : 10/515081 | |
| DATED | : March 23, 2010 | |
| INVENTOR(S) | : Frank Heinle et al. | |

It is certified that error appears in the above-identified patent and that said Letters Patent is hereby corrected as shown below:

Column 5
Claim 1, Line 5, "radio comprising an HF high-frequency) receiver, the" should read as, --radio comprising an HF (high-frequency) receiver, the--.

Signed and Sealed this
Fifth Day of April, 2011

David J. Kappos
*Director of the United States Patent and Trademark Office*